(12) United States Patent
Zhao (10) Patent No.: US 6,339,565 B1
(45) Date of Patent: Jan. 15, 2002

(54) NON-LINEAR CENTER-ERROR GENERATOR FOR DVD SERVO CONTROL

(75) Inventor: Yuanping Zhao, San Jose, CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/283,130

(22) Filed: Mar. 31, 1999

(51) Int. Cl.[7] .................................................. G11B 7/00
(52) U.S. Cl. ........................... 369/44.28; 369/44.35; 369/44.41
(58) Field of Search ......................... 369/44.41, 44.25, 369/44.29, 44.35, 44.32, 13, 44.12, 44.37, 44.27, 44.28, 44.14, 44.23

(56) References Cited

U.S. PATENT DOCUMENTS

| | | | |
|---|---|---|---|
| 4,539,665 A | 9/1985 | Iso et al. ....................... 369/44 |
| 5,121,370 A | * 6/1992 | Yanagi ..................... 369/44.28 |
| 5,138,596 A | 8/1992 | Yamada .................... 369/44.29 |
| 5,245,599 A | 9/1993 | Ishii et al. ................. 369/44.32 |
| 5,283,774 A | * 2/1994 | Mashimo ................. 369/44.32 |
| 5,289,447 A | * 2/1994 | Kobayashi et al. ...... 369/44.28 |
| 5,291,466 A | 3/1994 | Kwak ....................... 369/44.35 |
| 5,353,267 A | * 10/1994 | Katayama ..................... 369/13 |
| 5,444,686 A | 8/1995 | Dunlavy ....................... 359/48 |
| 5,475,664 A | 12/1995 | Shimizume et al. ..... 369/44.29 |
| 5,610,883 A | * 3/1997 | Yanagawa ................. 369/44.23 |
| 5,610,887 A | 3/1997 | Arai et al. ................ 369/44.35 |
| 5,642,341 A | 6/1997 | Stork ....................... 369/44.41 |
| 5,751,674 A | 5/1998 | Bradshaw et al. ........ 369/44.35 |
| 5,808,979 A | * 9/1998 | Ishibashi et al. .......... 369/44.35 |
| 5,852,592 A | * 12/1998 | Braat ....................... 369/44.35 |
| 5,859,816 A | 1/1999 | Yamamoto ............... 369/44.25 |
| 5,905,703 A | * 5/1999 | Osada ....................... 369/44.41 |
| 5,963,516 A | * 10/1999 | Hashimoto et al. ...... 369/44.29 |
| 6,016,293 A | * 1/2000 | Lee et al. ................. 369/44.25 |
| 6,233,210 B1 | * 5/2001 | Schell ....................... 369/44.41 |
| 6,285,636 B1 | * 9/2001 | Tay et al. ................. 369/44.35 |

OTHER PUBLICATIONS

Clements, "Understanding and Servicing CD Players", Newnes, 1994, pp. 66–69.

* cited by examiner

*Primary Examiner*—David Hudspeth
*Assistant Examiner*—Kim-Kwok Chu
(74) *Attorney, Agent, or Firm*—Stuart Auvinen (57) ABSTRACT

An optical-disk play-back system has a lens that receives a light beam reflected from a data surface of an optical disk. The lens focuses the light on four quadrant photodiodes. The position of the lens relative to the photodiodes is adjusted by a standard tracking control loop. In addition, the sledge position is controlled by a sledge-center-error signal. Since the sledge position changes only infrequently, the center error is a low-frequency signal. A non-linear center-error-generating circuit uses two op-amp stages. Signals from an inner pair of photodiodes are summed and applied to one input of the first-stage op amp, while signals from an outer pair of photodiodes are summed and applied to the other input of the first-stage op amp. The first-stage op amp output an overall error signal that includes high-frequency errors. A high-pass filter removes low-frequency components output from the first-stage op amp. The high-pass filter drives an inverting input of the second-stage op amp. The non-inverting input of the second-stage op amp receives the unfiltered output of the first-stage op amp. The second-stage op amp suppresses the high-frequency components from the overall error signal, producing a low-frequency center-error signal.

20 Claims, 7 Drawing Sheets

FIG. 1
PRIOR ART

PRIOR ART

NON-LINEAR CENTER-ERROR GENERATOR FOR DVD SERVO CONTROL

FIELD OF THE INVENTION

This invention relates to optical disk play-back systems, and more particularly to center-error detection for a lens and control for a sledge in the optical pickup.

BACKGROUND OF THE INVENTION

Optical disks such as compact disk (CD) and digital-versatile disk (DVD) have been quite popular in computer and consumer devices. Data is stored on the disk by pits on the surface or on an internal layer within the disk. When a laser or other light source is shined on the spinning disk, the light is scattered by the pits but reflected back to a photo-sensor when no pit is present.

The pits are arranged on the disk into a continuous spiral track. The laser and pickup head can be moved along the radius of the disk to select different portions of the continuous spiral track. Indeed, along any radius of the disk, the disk appears to have many separate tracks of increasing distance from the first track at the inner diameter (ID) to the last track at the outer diameter (OD) of the disk.

Figure 1:
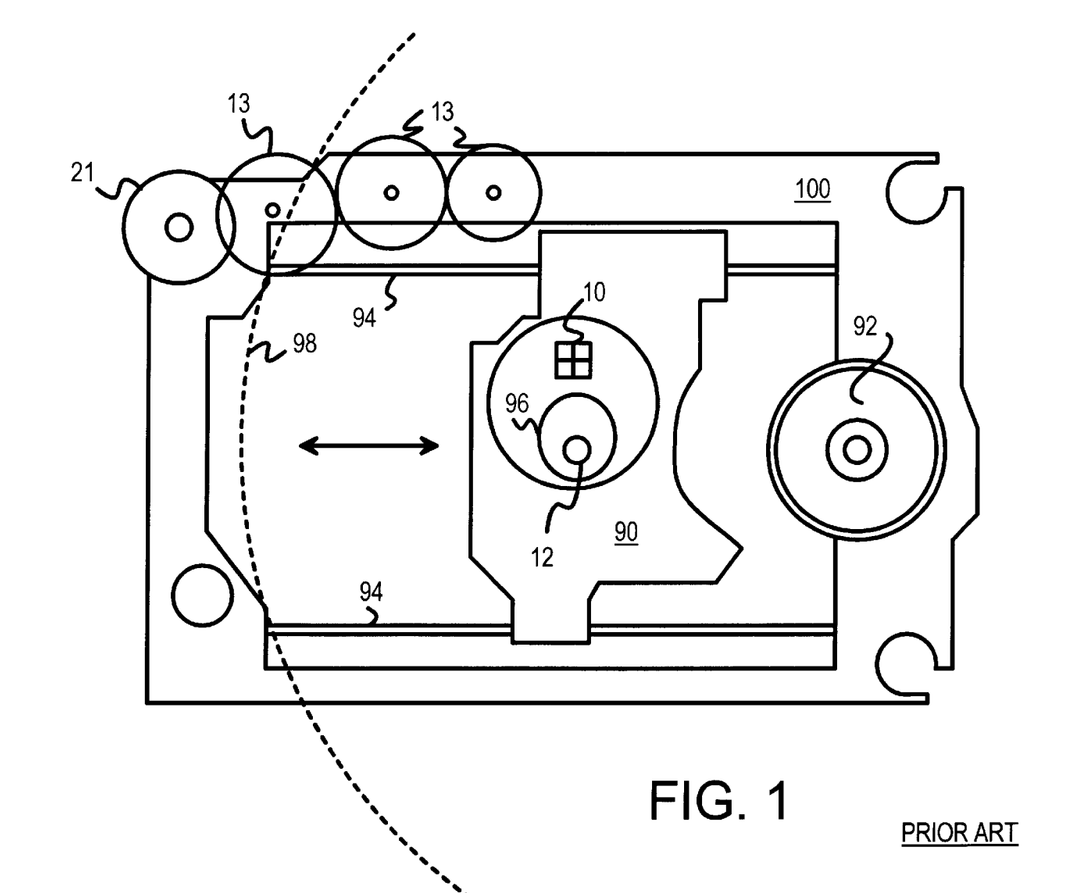
FIG. 1 shows a conventional pickup assembly for an optical disk.

FIG. 1 shows a pickup assembly for an optical disk. During operation, optical disk 98 is mounted on spindle 92, which fits into the hole at the center of optical disk 98. Spindle 92 has a motor (not shown) that spins the disk. Spindle 92 is mounted on or formed in pickup frame 100.

Pickup frame 100 is a frame around a hollow center. Sledge 90 slides along rods 94, which are metal rods mounted to pickup frame 100. Sledge 90 slides along the radius of optical disk 98 mounted on spindle 92, allowing any track on optical disk 98 to be selected for reading.

Sledge 90 contains electronics and optics for reading optical disk 98. Lens 12 receives a laser beam reflected from the surface of optical disk 98 and focuses the light onto photodiodes 10. A prism (not shown) is used to bend the light beam by ninety degrees.

Lens 12 fits inside cavity 96 on sledge 90. As optical disk 98 is being read, the position of lens 12 within cavity 96 is altered slightly by a tracking control loop. The signals from photodiodes 10 are used by the electronics in the tracking control loop to adjust the position of lens 12 within cavity 96 to keep lens 12 on the track. The rapid rotational speed of optical disk 98 causes the tracking adjustment signals to have a high frequency, allowing the position of lens 12 to be adjusted quickly. A focusing control loop also uses the signals from photodiodes 10 to rapidly adjust the vertical distance that lens 12 is above the reading surface of optical disk 98.

Since the tracks on optical disk 98 are actually one long spiral track, as optical disk 98 is continuously read, lens 12 gradually shifts to the outer diameter of optical disk 98, toward the left of FIG. 1. Eventually lens 12 would reach the left edge of cavity 96 if sledge 90 did not move. Motor 21 uses gears 13 which engage sledge 90, moving sledge 90 to also follow the track being read on optical disk 98.

In prior-art CD readers, motor 21 could simply be driven by a counter or other periodic signal, causing sledge 90 to gradually move to the OD at a constant rate. The tracking motion of lens 12 within cavity 96 was sufficiently large to maintain tracking with sledge 90 moving at a constant rate. The rate could be adjusted as the rotation speed of spindle 92 changed, or when an error in reading occurred.

However, newer DVD optical disks have a much higher recording density. Over 40,000 tracks are present from ID to OD on a DVD disk. Cavity 96 limits the tracking motion of lens 12 to about 500 tracks. Thus an additional control loop is always used to control motor 21, adjusting the position of sledge 90 more precisely. This is known as a center-error (CE) control loop.

Figure 2:
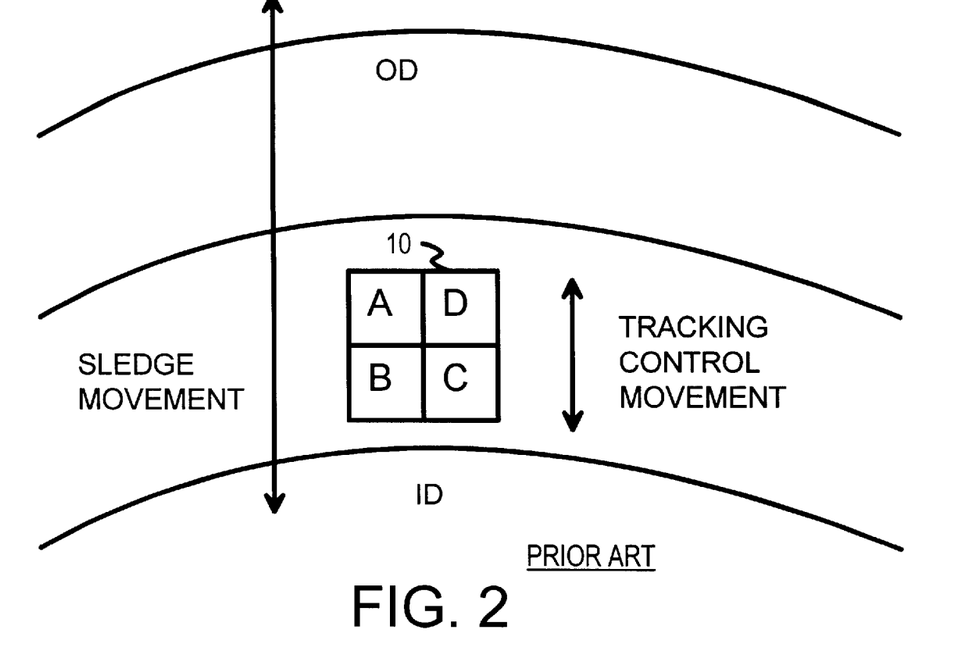
FIG. 2 illustrates a conventional photodiode pickup moving among tracks on an optical disk.

FIG. 2 illustrates a photodiode pickup moving among tracks on an optical disk. Photodiodes 10 contains four photodiodes, once for each quadrant. When photodiodes are exactly lined up along a track, photodiodes A and D pickup the same signal as photodiodes B and C. When mis-aligned, photodiodes A, D pickup more or less signal than photodiodes B,C. The difference in signal can be used to adjust the tracking, moving the lens focused onto photodiodes 10 either toward the outer diameter (OD) of the disk or toward the inner diameter (ID) of the disk.

Since any track on the disk can be selected, the sledge motion is rather large, spanning most of the radius of the disk. In contrast, the tracking motion of the lens within the cavity of the sledge is rather limited. High-frequency tracking-error circuits are used to rapidly adjust the lens position. Such tracking error generators using quadrant photodiodes are common. See for example, U.S. Pat. No. 5,859,816 by Yamamoto, and assigned to Toshiba, which uses phase comparison method. Focus control, where the optical distance to the disk is altered, is also known, such as described by Shimizume et al. in U.S. Pat. No. 5,475,664, and assigned to Sony Corp.

Another error is introduced when the lens is moved within the cavity by the tracking-error control loop. The lens position must be continuously adjusted within the cavity to maintain optical alignment with the track being read. However, if the sledge motion does not exactly match the track position, the lens may not be directly over the track. The light beam deviates from the perpendicular and a parallax error occurs. When the track is not directly under the lens, the alignment of the lens relative to the photodiodes and the disk surface is skewed from the perpendicular.

This parallax or center error can be corrected by shifting the position of the lens back to the center of the cavity in the sledge. However, the position of the sledge must change so that optical alignment to the track can be maintained. Sledge-centering errors are usually ignored in CD's since the larger track spacing and lower recording density make the error relatively insignificant. However, the sledge-centering error is more significant for higher-density DVD optical disks.

The lens may be shifted in position by a small tracking motion relative to the rest of the photodiode pickup assembly once the sledge is repositioned over the track being read. The range of motion of the sledge must be large, since during seek operations, the gears must quickly move the sledge to the desired track. During a continuous read operation, this sledge movement is very slight because the track spacing is very small. FIG. 2 shows the tracking movement of the lens within the sledge's cavity as being slight, while overall sledge movement is large.

Figure 3:
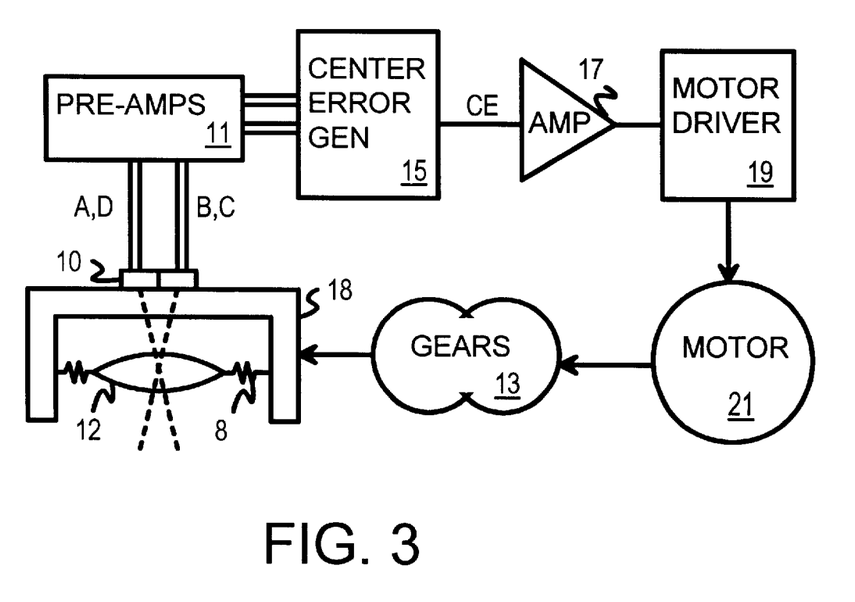
FIG. 3 shows a feedback loop that detects a sledge-center error and shifts the sledge position, allowing the tracking loop to shift the relative position of the lens within the sledge.

CENTER-ERROR FEEDBACK LOOP—FIG. 3

FIG. 3 shows a feedback loop that detects a sledge-center error and shifts the sledge position, allowing the tracking loop to shift the relative position of the lens within the sledge. Lens 12 receives a light beam reflected from a recording layer within an optical disk. Lens 12 projects this beam to photodiodes 10. The four photodiodes 10 each send a signal to preamplifier 11, which amplifies the four signals A, B, C, D from the four photodiodes 10. These four amplified signals are input to center-error detector 15. Center-error detector 15 compares the relative signal strengths and generates a center-error signal CE.

The center-error signal from detector 15 is amplified by amplifier 17 before being input to motor driver 19. Motor driver 19 controls motor 21. The output of motor 21 is geared down by gears 13 and then controls the position of sledge 18 that holds lens 12. As the position of sledge 18 is changed, a tracking control loop (not shown) rapidly changes the position of lens 12 Motor 21 thus controls the position of sledge 18. The relative position of lens 12 to photodiodes 10 is then adjusted by the tracking loop.

As the relative position of lens 12 within sledge 18 changes, the signal strengths from photodiodes 10 changes. This change is amplified and compared to generate the center-error signal CE that controls motor 21 and the position of sledge 18. The tracking feedback loop then adjusts the lens position to minimize the center error.

The center error is a low-frequency signal, since the motion of sledge 18 is slow. The tracking error that controls the position of lens 12 within the cavity on sledge 18 is a high-frequency signal, rapidly moving the much lighter lens to maintain tracking. Extracting the low-frequency sledge-center error from the photodiodes is difficult, since the high-frequency tracking error can dominate the photodiode signals. Without sledge-center error control, the lens could reach the edge of the cavity in the sledge, preventing further tracking adjustments. Such tracking-error saturation could cause the tracking to be lost, requiring a lengthy re-read of the data.

Figure 4A:
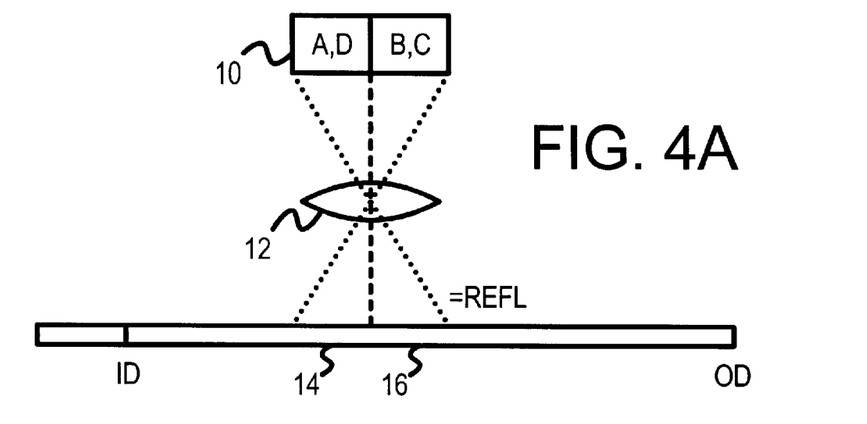
FIGS. 4A–4C highlight optical geometries that cause sledge-centering errors.
Figure 4B:
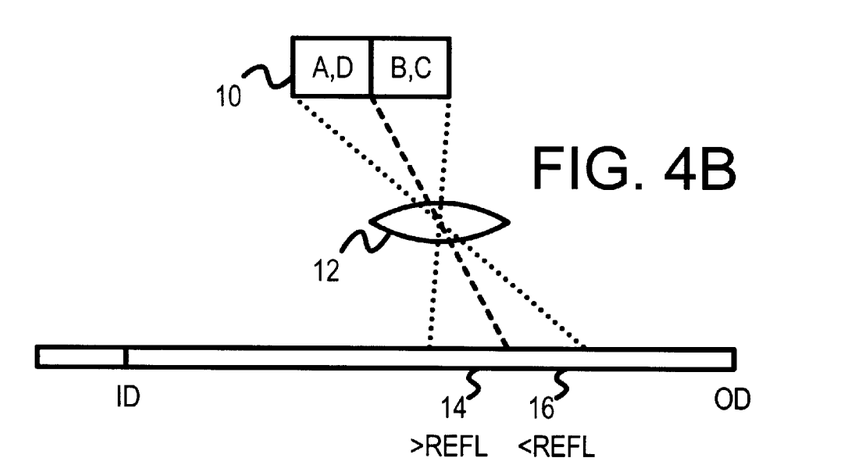
Figure 4C:
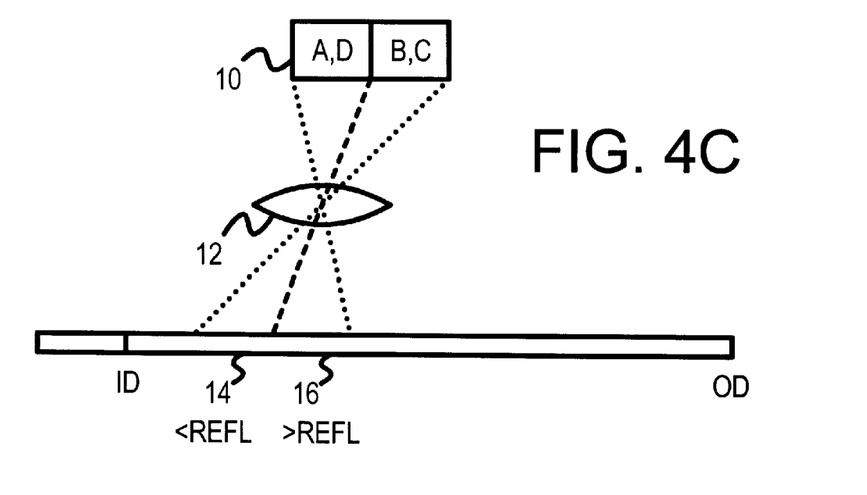

SLEDGE-CENTER ERRORS—FIGS. 4

FIGS. 4A–4C highlight sledge centering errors. In FIG. 4A, lens 12 is exactly centered within the sledge that includes photodiodes 10. No center error exists. Photodiodes A and D receive light reflected from region 16 on the optical disk, while photodiodes B and C receive the light reflected from region 14 on the disk. Since the middle of photodiodes 10 is aligned with the middle of lens 12, the angle that light reflects from region 16 of the disk to photodiodes A, D has the same magnitude as the light reflected from region 14 to photodiodes B, C. Regions 14, 16 have the same area and angle of reflection. Thus the intensity of the light received by photodiodes A, D is the same as the intensity of light received by photodiodes B, C, on the average. This can be expressed as (A+D)=(B+C), and the center error CE=[(A+D)−(B+C)]=0.

In FIG. 4B, lens 12 is mis-aligned to the outside (OD) of the cavity within the sledge that includes photodiodes 10. A negative center error exists. Photodiodes A and D receive light reflected from region 16 on the optical disk, while photodiodes B and C receive the light reflected from region 14 on the disk. The middle of photodiodes 10 is shifted toward the center of the optical disk compared with the middle of lens 12.

The angle that light reflects from region 16 of the disk to photodiodes A, D is lower or more glancing when compared with the light reflected from region 14 to photodiodes B, C, which has a larger angle of reflection (is closer to the perpendicular). Region 16 has a larger area than region 14, so that the light intensity reflected from region 16 is reduced. Thus the intensity of the light received by photodiodes A, D is less than the intensity of light received by photodiodes B, C, on the average. This can be expressed as (A+D)<(B+C), and the center error CE=[(A+D)−(3+C)]<0. To correct this negative center error, the lens must be moved toward the center (ID) of the disk by the tracking control, once the sledge containing the photodiode assembly is moved toward the outside (OD).

In FIG. 4C, lens 12 is mis-aligned to the inside within the cavity of the sledge that includes photodiodes 10. A positive center error exists. Photodiodes A and D receive light reflected from region 16 on the optical disk, while photodiodes B and C receive the light reflected from region 14 on the disk. The middle of photodiodes 10 is shifted toward the outside of the optical disk compared with the middle of lens 12. The angle that light reflects from region 16 of the disk to photodiodes A, D is larger or more perpendicular when compared with the light reflected from region 14 to photodiodes B, C. Region 16 has a smaller area than region 14, so that the light intensity reflected from region 16 is larger. Thus the intensity of the light received by photodiodes A, D is greater than the intensity of light received by photodiodes B, C, on the average. This can be expressed as (A+D)>(B+C), and the center error CE=[(A+D)−(B+C)]>0. To correct this positive center error, the lens must be moved toward the outside (OD) of the disk, which the tracking control loop does once the sledge with the photodiode assembly is moved toward the inside (ID).

What is desired is a sledge-center-error generating circuit. A circuit that receives inputs from quadrant photodiodes and detects a lens mis-alignment and generates a center-error signal is desired. A circuit that filters out high-frequency tracking errors is desired to generate a sledge-centering error signal. A feedback loop to control the position of the sledge is desired. More precise tracking is desired by adjusting the sledge position using a low-frequency sledge control loop.

SUMMARY OF THE INVENTION

A sledge-center-error generating circuit has photodiode inputs. It receives signals from photodiodes receiving a light beam reflected from a data layer of an optical disk. A first summer receives a first pair of the photodiode inputs. It generates a first sum signal.

A second summer receives a second pair of the photodiode inputs. It generates a second sum signal. A first subtractor receives the first sum signal and the second sum signal. It generates an overall error signal as a difference of the first sum signal and the second sum signal.

A high-pass element receives the overall error signal from the first subtractor. It stops low-frequency error signal and passes a high-frequency error signal.

A second subtractor receives the overall error signal and the high-frequency error signal. It generates a low-frequency error signal by non-linearly suppressing the high-frequency error signal from the overall error signal. The low-frequency error signal represents a sledge-center error. The low-frequency error signal for adjusting a position of a sledge containing the photodiodes. Thus the sledge-center error is generated by suppressing the high-frequency error signal.

In further aspects of the invention, the photodiode inputs are generated by a quadrant photodiode array. The first pair of photodiode inputs are on an outer side of the photodiode array and the second pair of photodiode inputs are on an inner side of the photodiode array. The inner side receives light reflected from an area of the optical disk with a smaller radius than an area reflecting light to the first pair.

DETAILED DESCRIPTION

The present invention relates to an improvement in sledge control for optical disk readers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that constant-speed sledge movement may cause the lens position relative to the photodiode position to become saturated, reaching the wall of the cavity. This causes a lost-tracking error for higher-density optical disks. The sledge movement can be more accurately controlled by a center-error feedback loop. A sledge-center error can be detected when four quadrant photodiodes are used in the pickup assembly. The signals from the photodiodes on the outside of the current track are summed, as are the signals from the photodiodes on the inside of the track. The summed signals are then subtracted to generate an overall error signal.

The inventor has further realized that the overall error signal contains high-frequency content, since the tracking servo may be adjusting the location of lens within the sledge, while an even higher-frequency component is caused by the pits and lands on the portion of the track being read. The signal also contains extraneous spindle modulation components. These high-frequency signals can overpower the slower center-error signal.

Since the sledge position does not change quickly, the actual sledge center-error is a low-frequency signal. The inventor has realized that the unwanted high-frequency tracking and data signals can be suppressed from the overall error signal. The resulting signal contains just the sledge-center error signal.

Figure 5:
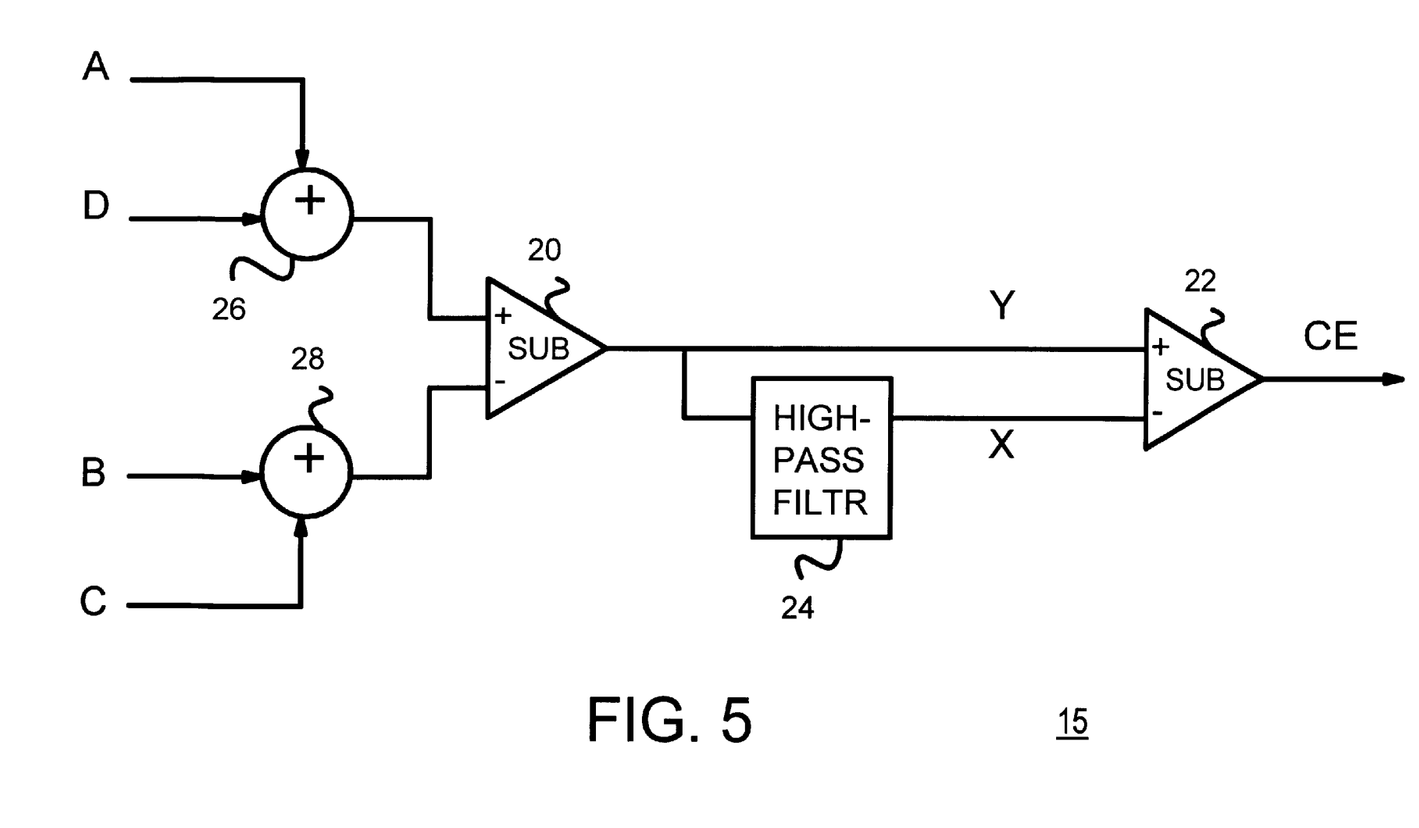
FIG. 5 is a block diagram of a sledge-center-error generating circuit.

BLOCK DIAGRAM—FIG. 5

FIG. 5 is a block diagram of a sledge-center-error generating circuit. The four signals A, B, C, D from the four quadrant photodiodes are received by center-error detector 15, preferably after being amplified slightly. The signals from outer photodiodes A, D are summed by summer 26, while the signals from inner photodiodes B, C are summed by summer 28.

Op amp 20 acts as a subtractor, subtracting the inner sum (B+C) from the outer sum (A+D). The output Y from op amp 20 is [(A+D)−(B+C)]. Output Y contains both high and low frequency components.

Since the lens position changes very slowly, the sledge-center error is a low-frequency signal. The high-frequency signals may easily overpower the low-frequency center error in output Y. High-pass element 24 attenuates low-frequency signals while passing high-frequency components of output Y. The resulting output X from high-pass element 24 represents the high-frequency components of the output Y.

Op amp 22 acts as a non-linear subtractor, suppressing the high-frequency component X from the combined output Y from op amp 20. The output of op amp 22 is approximately Y-X, or just the low-frequency component of the overall error signal Y. This low-frequency result is the sledge-center error, signal CE.

Using non-linear suppression of the high-frequency components allows for more precise generation of the clean center error signal while keeping the circuit simple. The first stage obtains a combination of signals, in a center-error format, from the quadrant photodiode array. The second stage obtains the desired frequency characteristics of the center-error signal. A band-limited signal X is subtracted from the second stage, so the result becomes non-linear. The non-linear center-error generator generates the overall error signal in the first stage, while suppressing the high-frequency components in the second stage. The spindle modulation is removed, as are higher-frequency components.

Figure 6:
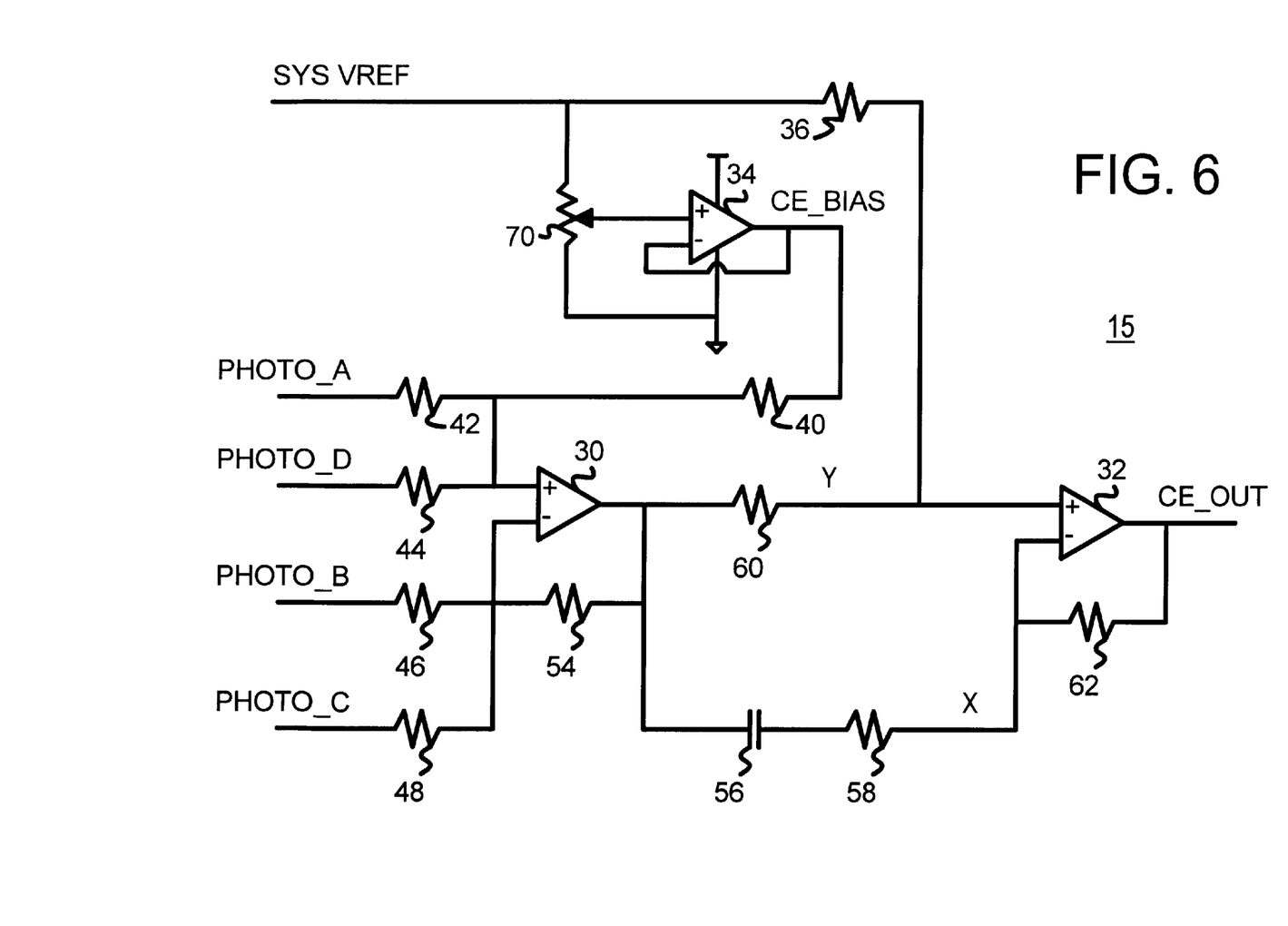
FIG. 6 is a schematic of the sledge-center-error generating circuit.

SCHEMATIC—FIG. 6

FIG. 6 is a schematic of the sledge-center-error generating circuit. The pre-amplified input signals from photodiodes A, D, B, C are input through resistors 42, 44, 46, 48, respectively. Resistors 42, 44 have their outputs connected together, summing currents from photodiodes A and D. Likewise, the outputs of resistors 46, 48 are connected together, summing the currents from photodiodes B and C. The summed A, D currents from resistors 42, 44 are applied to the non-inverting input of op amp 30, while the summed B, C currents from resistors 46, 48 are applied to the inverting input of op amp 30.

Op amp 30 subtracts the summed currents from photodiodes B, C from the summed currents from photodiodes A, D. The result from op amp 30, Y=[(A+D)−(B+C)], is applied to the non-inverting input of second op amp 32 through resistor 60. Resistor 60, the input resistor for op amp 32, passes both the high and low frequency components of signal Y.

Capacitor 56 and resistor 58 in series form a high-pass filter, passing the high-frequency components but not the low-frequency components of signal Y output from op amp 30. The output of the filter (signal X) is applied to the inverting input of op amp 32, since resistor 58 is connected to the inverting input of op amp 32. Op amp 32 subtracts the filtered signal X from the unfiltered overall error signal Y output by op amp 30, producing the center error signal CE. Since op amp 32 removes the high-frequency components from the overall error signal, only the low-frequency error signal remains in signal CE. This is approximately a D.C. signal that represents the sledge-center error, once the spindle modulation and tracking errors are removed.

Resistor 54 is connected across the output and inverting input of op amp 30, acting as a feedback resistor to determine the gain of op amp 30. Resistor 62 is connected across the output and inverting input of op amp 32, acting as a feedback resistor to determine the gain of op amp 32. The output swing of signal CE from op amp 32 ranges from 1 to 3 volts. When the sledge is positioned correctly and the lens is therefore centered, the signal is at the midrange, 2 volts. When the lens has shifted to the OD, the signal approaches 1 volt. When the lens has shifted to the ID, the signal approaches 3 volts.

A system reference voltage, SYS_VREF, is summed into the non-inverting input of op amp 32 through balancing resistor 36 to shift the CE output to a desired D.C level. A bias voltage, CE_BIAS, is likewise applied to the non-inverting input of op amp 30 through resistor 40. This compensates for a possible imbalance between photodiode signals A, D and B, C.

Bias voltage CE_BIAS is generated from SYS_VREF using op amp 34, which acts as a voltage buffer. Variable resistor 70 receives SYS_VREF, dividing down the voltage applied to the non-inverting input of op amp 34.

In one embodiment, resistors 42, 44, 46, 48 are 20K-ohm, resistors 40, 54 are 220K-ohm, resistors 58, 60 are 2.2K-ohm, and resistor 36 is 4.7 K-ohm. Capacitor 56 is 2.2 $\mu$F. Variable resistor 70 is 20 K-ohm maximum. Reference voltage VREF is 2 volt, and CE_BIAS is set at 1.28 volt.

Figure 7A:
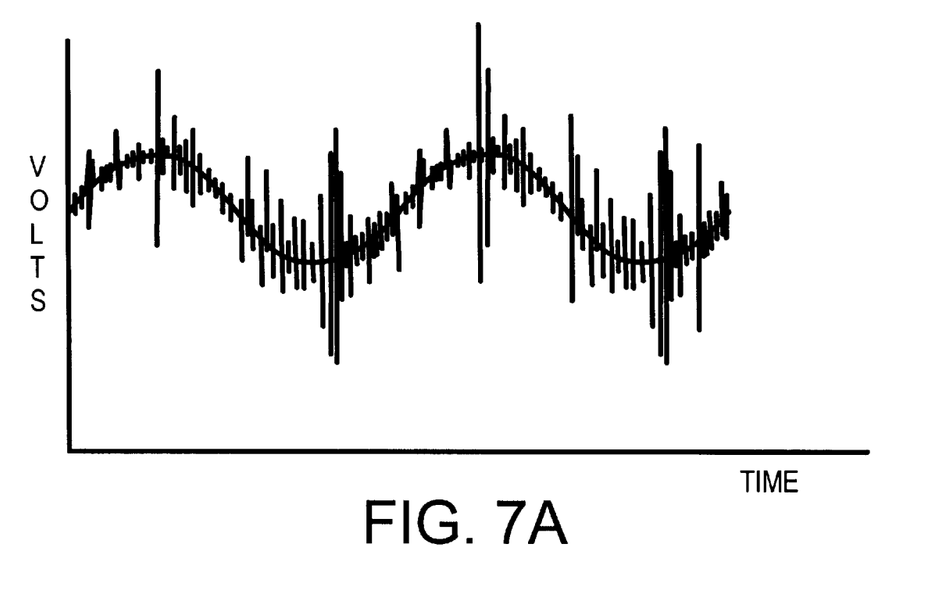
FIG. 7A shows a center-error signal using a prior-art center-error generator.
Figure 7B:
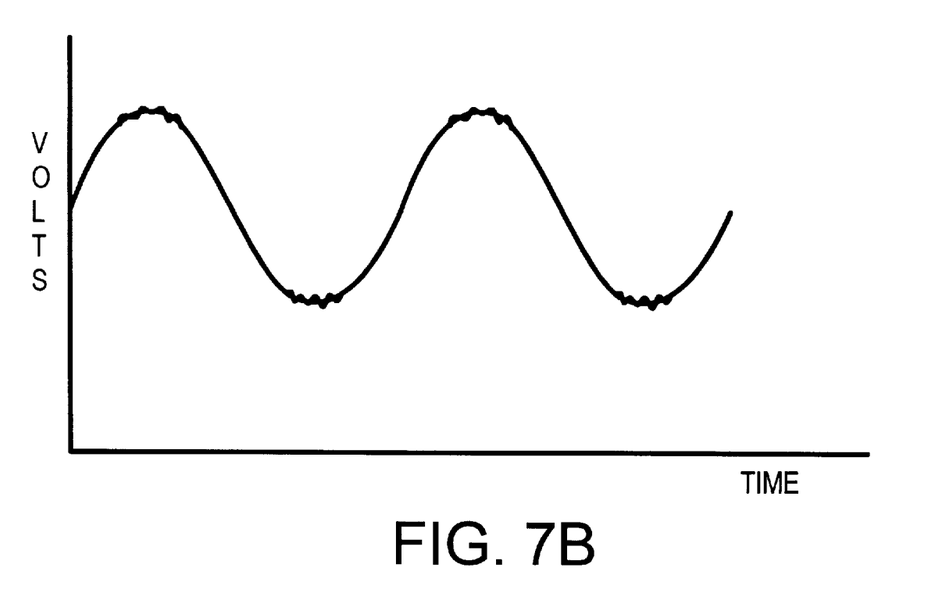
FIG. 7B shows a waveform from the dual-stage non-linear center-error generator.

WAVEFORMS—FIGS. 7

FIG. 7A shows a center-error signal using a prior-art center-error generator. High-frequency noise is superimposed over the low-frequency error signal. Since the high-frequency signal is strong, the amplitude of the noise can approach or surpass the amplitude of the desired low-frequency CE signal. This makes use of the center-error signal problematic.

FIG. 7B shows a waveform from the nonlinear center-error generator. Using the non-linear second stage, the generated center error has the high-frequency noise suppressed, leaving a clean low-frequency signal. The amplitude of the low-frequency signal can be adjusted higher for better control result.

ADVANTAGES OF THE INVENTION

Extracting the low-frequency sledge-center error from the photodiodes is difficult, since the high-frequency tracking error can dominate the photodiode signals. Without sledge-center error control, the lens could reach the edge of the cavity in the sledge, preventing further tracking adjustments. Such tracking-error saturation could cause the tracking to be lost, requiring a lengthy re-read of the data.

The sledge-center-error generating circuit receives inputs from quadrant photodiodes and detects a lens misalignment, generating a center-error signal. The circuit filters out high-frequency errors to generate a slowly-changing sledge-centering error signal. A sledge-movement feedback loop controls the position of the sledge. The faster tracking control loop then adjusts the lens position relative to the photodiodes. More precise tracking is achieved by adjusting the sledge position as well as the lens position within the sledge assembly.

Generally speaking, the circuit of this invention is simpler than using linear subtraction or linear filtering, yet it generates a cleaner center error.

ALTERNATE EMBODIMENTS

Several other embodiments are contemplated by the inventor. For example other circuit modifications or arrangements may be substituted. The high-pass element, summers, and subtractors may be implemented as digital functions such as in a digital-signal processor (DSP) rather than as analog functions. Firmware rather than hardware may be used for some or all of the functions. Other kinds of non-linear suppressors of the high-frequency components can be used.

Figure 8:
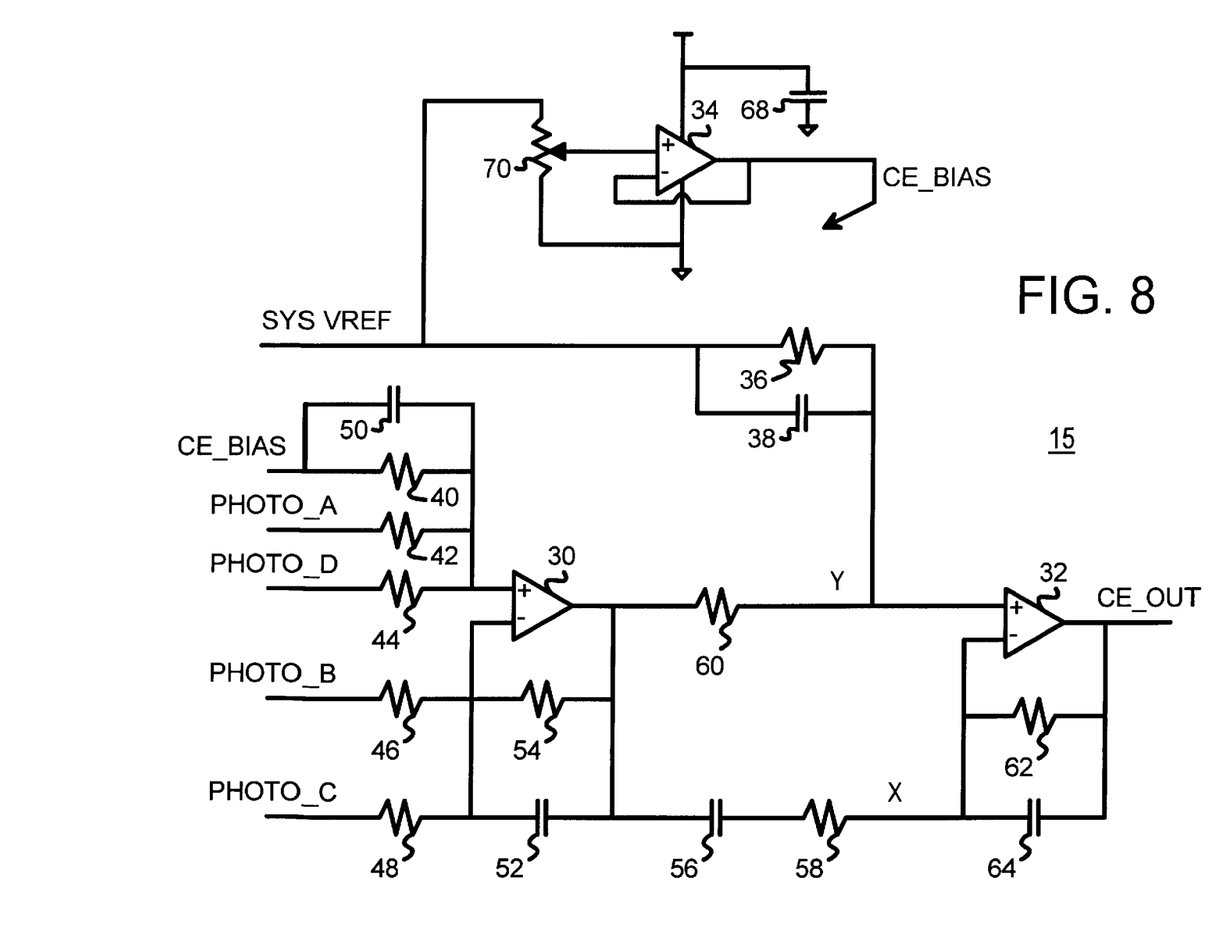
FIG. 8 is an alternate embodiment.

FIG. 8 is an alternate embodiment. Capacitors 38, 50, 52, 64, and/or 68 can be added as shown in FIG. 8. Capacitor 52 is connected across the output and inverting input of op amp 30, for limiting bandwidth. Capacitor 64 is connected across the output and inverting input of op amp 32, limiting bandwidth. Capacitors 38, 50 limit bandwidth while keep the circuit in balance. Capacitor 68 filters the power-supply voltage. Capacitors 38, 50, 52, 64 are 220 pF, filter capacitor 56 is 2.2 $\mu$F, and capacitor 68 is 0.1 $\mu$F in the example.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A sledge-center-error generating circuit comprising:

photodiode inputs, receiving photodiodes' detected signals which is a light beam reflected from a data layer of an optical disk;

a first summer, receiving a first pair of signals from the photodiode inputs, for generating a first sum signal;

a second summer, receiving a second pair of signals from the photodiode inputs, for generating a second sum signal;

a first subtractor, receiving the first sum signal and the second sum signal, for generating an overall error signal as a difference of the first sum signal and the second sum signal;

a high-pass filter, receiving the overall error signal from the first subtractor, for generating a high-frequency error signal; and a second subtractor, receiving the overall error signal and the high-frequency error signal, for generating a low-frequency error signal by non-linearly suppressing the high-frequency error signal from the overall error signal;

wherein the low-frequency error signal represents a sledge-center error, the low-frequency error signal for adjusting a position of a sledge containing the photodiodes, whereby the sledge-center error is generated by suppressing the high-frequency error signal.

2. The sledge-center-error generating circuit of claim 1 wherein the photodiode inputs are generated by a quadrant photodiode array, wherein the first pair of photodiode inputs are on an outer side of the photodiode array and the second pair of photodiode inputs are on an inner side of the photodiode array, the inner side receiving light reflected from an area of the optical disk with a smaller radius than an area reflecting light to the first pair.

3. The sledge-center-error generating circuit of claim 2 wherein the second subtractor is non-linear.

4. The sledge-center-error generating circuit of claim 3 wherein the first subtractor is an op amp having a non-inverting input and an inverting input;

wherein the second subtractor is an op amp having a non-inverting input and an inverting input.

5. The sledge-center-error generating circuit of claim 4 further comprising:
   a first feedback resistor, coupled between the output and the inverting input of the first subtractor;
   a second feedback resistor, coupled between the output and the inverting input of the second subtractor;
   whereby the first and second subtractors are gain-limited.

6. The sledge-center-error generating circuit of claim 5 wherein the first summer comprises a pair of resistors connected in parallel to a first input of the first subtractor;
   wherein the second summer comprises a pair of resistors connected in parallel to a second input of the second subtractor;
   wherein currents from the photodiode inputs are summed.

7. The sledge-center-error generating circuit of claim 6 further comprising:
   a connecting resistor, coupling the overall error signal output from the first subtractor to a first input of the second subtractor;
   a system reference -voltage input, coupled to the first input of the second subtractor, for adjusting a reference voltage level of the low-frequency error signal output from the second subtractor.

8. The sledge-center-error generating circuit of claim 7 further comprising:
   a CE-bias-voltage input, coupled to the first input of the first subtractor, for adjusting a reference voltage level of the overall error signal output from the first subtractor;
   a CE-bias generator, receiving the system reference voltage, for generating a CE-bias voltage to the first subtractor.

9. The sledge-center-error generating circuit of claim 8 wherein the CE-bias generator comprises:
   a variable resistor, receiving the system reference voltage, for generating a divided system reference voltage;
   an op amp, receiving the divided system reference voltage on a non-inverting input, configured as a voltage buffer, the output of the op amp being the CE-bias voltage.

10. The sledge-center-error generating circuit of claim 9 wherein the system reference voltage is coupled to the first input of the second subtractor through a resistor and a capacitor in parallel;
    wherein the CE-bias voltage is coupled to the first input of the first subtractor through a resistor and a capacitor in parallel.

11. The sledge-center-error generating circuit of claim 10 wherein the high-pass filter comprises a capacitor and a resistor in series.

12. A sledge-centering error control loop comprising:
    a moveable sledge having a lens receiving light reflected from a data-containing surface of an optical disk and photodiodes receiving light from the lens;
    wherein a position of the lens within the moveable sledge is adjusted by a tracking control loop to maintain optical alignment of a track of data on the optical disk with the photodiodes;
    a sledge-position adjuster for moving the moveable sledge in a direction along a radius of the optical disk;
    a center-error circuit having:
      a first summer, receiving signals from the photodiodes from light reflected predominantly from one side of the track, for generating a first sum signal;
      a second summer, receiving signals from the photodiodes from light reflected predominantly from an opposite side of the track, for generating a second sum signal;
      a first op amp, receiving the first sum signal at a non-inverting input and the second sum signal at an inverting input, for outputting an overall error signal representing an overall alignment error of the lens to the track, the overall alignment error including high-frequency tracking errors and a low-frequency sledge-position error;
      a high-pass filter, receiving the overall error signal, for attenuating low-frequency errors in the overall error signal to output a high-frequency error signal; and
      a second op amp, receiving the overall error signal at a non-inverting input and the high-frequency error signal from the high-pass filter at an inverting input, for outputting a center-error CE signal, the CE signal representing the low-frequency sledge-position error;
    wherein the CE signal is applied to the sledge-position adjuster, the CE signal adjusting a position of the moveable sledge to compensate for low-frequency sledge-position errors;
    wherein the sledge movement is adjusted by the low-frequency CE signal while the lens position is adjusted by the high-frequency tracking control loop.

13. The sledge-centering error control loop of claim 12 wherein the tracking control loop is able to adjust the position of the lens within the moveable sledge to select among less than 500 tracks, while the sledge-position adjuster is able to move the moveable sledge to select from among over 40,000 tracks.

14. The sledge-centering error control loop of claim 13 wherein the optical disk is a digital-versatile disk (DVD).

15. The sledge-centering error control loop of claim 12 further comprising: a preamplifier, coupled to the photodiodes, for amplifying signals from the photodiodes.

16. The sledge-centering error control loop of claim 12 wherein the sledge-position adjuster comprises:
    a motor;
    an amplifier, receiving the CE signal, for driving the motor; and
    gears, coupled to the motor, for reducing motion of the motor to move the moveable sledge along the radius of the optical disk;
    whereby the CE signal controls the motor to adjust a position of the moveable sledge.

17. The sledge-centering error control loop of claim 12 wherein the photodiodes comprise four photodiodes arranged into a four-quadrant array.

18. An optical disk pickup assembly comprising:
    a rigid frame surrounding an opening;
    spindle means, fitting a center hole of an optical disk, the spindle means for rotating the optical disk;
    sledge means, mounted on the track means in the opening of the rigid frame, having a lens means receiving light reflected from a data-containing surface of the optical disk and photodiode means receiving light from the lens means;
    wherein a position of the lens means within the sledge means is adjusted by a tracking control means to maintain optical alignment of a track of data on the optical disk with the photodiode means;
    track means, mounted in the opening of the rigid frame, for supporting the sledge means;

sledge-position adjust means, coupled to the rigid frame, for moving the sledge means in a direction along a radius of the optical disk;

a center-error circuit having:
  first sum means, receiving signals from the photodiode means from light reflected predominantly from one side of the track, for generating a first sum signal;
  second sum means, receiving signals from the photodiode means from light reflected predominantly from an opposite side of the track, for generating a second sum signal;
  first op amp means, receiving the first sum signal at a non-inverting input and the second sum signal at an inverting input, for outputting an overall error signal representing an overall alignment error of the lens means to the track, the overall alignment error including high-frequency tracking errors and a low-frequency sledge-position error;
  high-pass means, receiving the overall error signal, for attenuating low-frequency errors in the overall error signal to output a high-frequency error signal;
  second op amp means, receiving the overall error signal at a non-inverting input and the high-frequency error signal from the high-pass means at an inverting input, for outputting a center-error CE signal means, the CE signal means representing the low-frequency sledge-position error;

wherein the CE signal means is applied to the sledge-position adjust means, the CE signal means for adjusting a position of the sledge means for to compensate for low-frequency sledge-position errors;

wherein movement of the sledge means is adjusted by a low-frequency CE signal while the position of the lens means is adjusted by a high-frequency tracking control means.

19. The optical disk pickup assembly of claim 18 further comprising: bias means, applied to the non-inverting input of the second op amp means, for adjusting a bias voltage of the CE signal means.

20. The optical disk pickup assembly of claim 19 wherein the optical disk is a digital-versatile disk (DVD) having a continuous spiral track of over 40,000 tracks.

* * * * *